US010562557B2

United States Patent
Gong et al.

(10) Patent No.: US 10,562,557 B2
(45) Date of Patent: Feb. 18, 2020

(54) FOLDABLE GOLF TROLLEY

(71) Applicant: CADDIESTER GOLF BUGGY TECHNOLOGY LTD, Changzhou, Jiangsu (CN)

(72) Inventors: Xiaojun Gong, Jiangsu (CN); Ximing Kou, Jiangsu (CN)

(73) Assignee: CADDIESTER GOLF BUGGY TECHNOLOGY LTD, Changzhou (CN)

( * ) Notice: Subject to any disclaimer, the term of this patent is extended or adjusted under 35 U.S.C. 154(b) by 223 days.

(21) Appl. No.: 15/916,230

(22) Filed: Mar. 8, 2018

(65) Prior Publication Data
US 2018/0194382 A1    Jul. 12, 2018

Related U.S. Application Data

(63) Continuation-in-part of application No. PCT/CN2016/079004, filed on Apr. 11, 2016.

(30) Foreign Application Priority Data

Sep. 9, 2015    (CN) .......................... 2015 1 0565859

(51) Int. Cl.
*B62B 3/02*    (2006.01)
*A63B 55/60*    (2015.01)
(Continued)

(52) U.S. Cl.
CPC .............. *B62B 3/022* (2013.01); *A63B 55/60* (2015.10); *B62B 3/106* (2013.01); *B62B 3/12* (2013.01);
(Continued)

(58) Field of Classification Search
CPC ....... B62B 1/12; B62B 2205/12; B62B 1/002; B62B 3/02; B62B 1/125; B62B 2202/02
See application file for complete search history.

(56) References Cited

U.S. PATENT DOCUMENTS 5,582,419 A * 12/1996 Lucia ...................... B62B 1/045
                                                                280/42
7,147,242 B2 * 12/2006 Wu .......................... B62B 3/12
                                                                280/641
(Continued)

FOREIGN PATENT DOCUMENTS

CN        201684379 U      12/2010
CN        201906431 U       7/2011
(Continued)

OTHER PUBLICATIONS

International Search Report of PCT Patent Application No. PCT/CN2016/079004 dated Jun. 22, 2016.

*Primary Examiner* — John D Walters
*Assistant Examiner* — James J Triggs

(57) ABSTRACT

A foldable golf trolley includes a standing tube assembly movably coupled with a front wheel assembly through a front wheel connecting rod. A bottom tube assembly is connected with the front wheel assembly and the standing tube assembly. A four-rod linkage is formed by the standing tube assembly, the front wheel connecting rod, the front wheel assembly and the bottom tube assembly. The standing tube assembly is connected with the left and right wheel assemblies through a left and right wheel connecting rod assembly respectively. The left/right wheel connecting rod assembly includes a left/right wheel driving connecting rod and a left/right wheel driven connecting rod, and a left/right wheel four-rod linkage is formed by the left/right wheel driving connecting rod, the left/right wheel assembly, the left/right wheel driven connecting rod and the bottom tube assembly. The trolley could be quickly folded into a compact structure and unfolded.

8 Claims, 6 Drawing Sheets

(51) Int. Cl.
*B62B 3/10* (2006.01)
*B62B 3/12* (2006.01)
(52) U.S. Cl.
CPC ..... *A63B 2210/50* (2013.01); *B62B 2202/404* (2013.01); *B62B 2205/18* (2013.01); *B62B 2301/05* (2013.01)

(56) References Cited

U.S. PATENT DOCUMENTS

| | | | | |
|---|---|---|---|---|
| 7,862,053 B2* | 1/2011 | Liao | ............... | B62B 3/02 |
| | | | | 280/38 |
| 7,866,685 B2* | 1/2011 | Liao | ............... | B62B 3/12 |
| | | | | 280/651 |
| 8,226,112 B2* | 7/2012 | Liao | ............... | B62B 3/02 |
| | | | | 280/47.34 |
| 8,393,633 B2* | 3/2013 | Liao | ............... | B62B 3/02 |
| | | | | 280/651 |
| 8,820,776 B2* | 9/2014 | Wang | ............ | B62B 3/02 |
| | | | | 280/651 |

FOREIGN PATENT DOCUMENTS

| | | |
|---|---|---|
| CN | 204337671 U | 5/2015 |
| TW | 200738507 A | 10/2007 |

* cited by examiner

FOLDABLE GOLF TROLLEY

CROSS REFERENCE TO RELATED APPLICATIONS

The present application is a Continuation-in-part Application of PCT application No. PCT/CN2016/079004 filed on Apr. 11, 2016, which claims the benefit of Chinese Patent Application No. 201510565859.1 filed on Sep. 9, 2015. The contents of all of the above are hereby incorporated by reference.

FIELD OF THE TECHNOLOGY

The present application relates to the field of golf trolley technology, and in particular to a foldable golf trolley.

BACKGROUND

At present, there are various kinds of golf trolleys in the market. Different folding methods could be applied to golf trolleys of different structures.

Taking a golf trolley having one main frame and three lower tubes connecting with wheels as an example, the folding or unfolding it with existing technology requires quite a few steps to complete. The operation is tedious and complicated. In the meantime, it brings some problems after folding such as incompact structure and taking up too much storage space.

SUMMARY

The technical problem to be solved in the present application is to provide a foldable golf trolley, which can simplify the folding and unfolding process of golf trolleys. It is convenient to use, compact in structure, and it saves user's time.

To solve the above-mentioned technical problem, the technical solution is to provide a a foldable golf trolley including: a standing tube assembly; a bottom tube assembly; a front wheel assembly; and a left and right wheel assembly, wherein the standing tube assembly is movably coupled with the front wheel assembly through a front wheel connecting rod, the bottom tube assembly is connected with the front wheel assembly and the standing tube assembly, and a four-rod linkage is formed by the standing tube assembly, the front wheel connecting rod, the front wheel assembly and the bottom tube assembly.

The standing tube assembly is connected with the left and right wheel assemblies through a left and right wheel connecting rod assembly respectively.

The left wheel connecting rod assembly includes a left wheel driving connecting rod and a left wheel driven connecting rod, and a left wheel four-rod linkage is formed by the left wheel driving connecting rod, the left wheel assembly, the left wheel driven connecting rod and the bottom tube assembly.

The right wheel connecting rod assembly includes a right wheel driving connecting rod and a right wheel driven connecting rod, and a right wheel four-rod linkage is formed by the right wheel driving connecting rod, the right wheel assembly, the right wheel driven connecting rod and the bottom tube assembly.

In a preferred embodiment, the standing tube assembly, the left and right wheel connecting rod assemblies achieve synchronized coupling movement through a central hub, and the central hub includes a pair of symmetric left and right driving gears, and left and right driven gears engaging with the left and right driving gears respectively.

In a preferred embodiment, the left driven gear provides driving power for the left wheel driving connecting rod.

In a preferred embodiment, the right driven gear provides driving power for the right wheel driving connecting rod.

In a preferred embodiment, the front wheel four-rod linkage, the left and right wheel four-rod linkages move in a direction towards a center of the trolley when the trolley is being folded.

In a preferred embodiment, the driving gears, the left and right driven gears are bevel gears.

In a preferred embodiment, a handle assembly is connected with an upper end of the standing tube assembly.

In a preferred embodiment, a connecting region of the standing tube assembly and the handle assembly is provided with an upper bag support assembly.

The beneficial effect of the foldable golf trolley of the present application is that a user can quickly fold the entire golf trolley into a compact structure. This can simplify the folding and unfolding of golf trolley, making it more convenient to use the golf trolley and saving user's time and energy.

BRIEF DESCRIPTION OF THE DRAWINGS

In order to more clearly illustrate the technical solution provided by the embodiments of the foldable golf trolley of the present application, the drawings to be used in the description of the embodiments will be briefly described below. It will be apparent that the drawings mentioned in the following description are merely some implementations of the foldable golf trolley. Without making any creative effort, a person skilled in the art may derive other drawings from the drawings in the present application, wherein.

Figure 1:
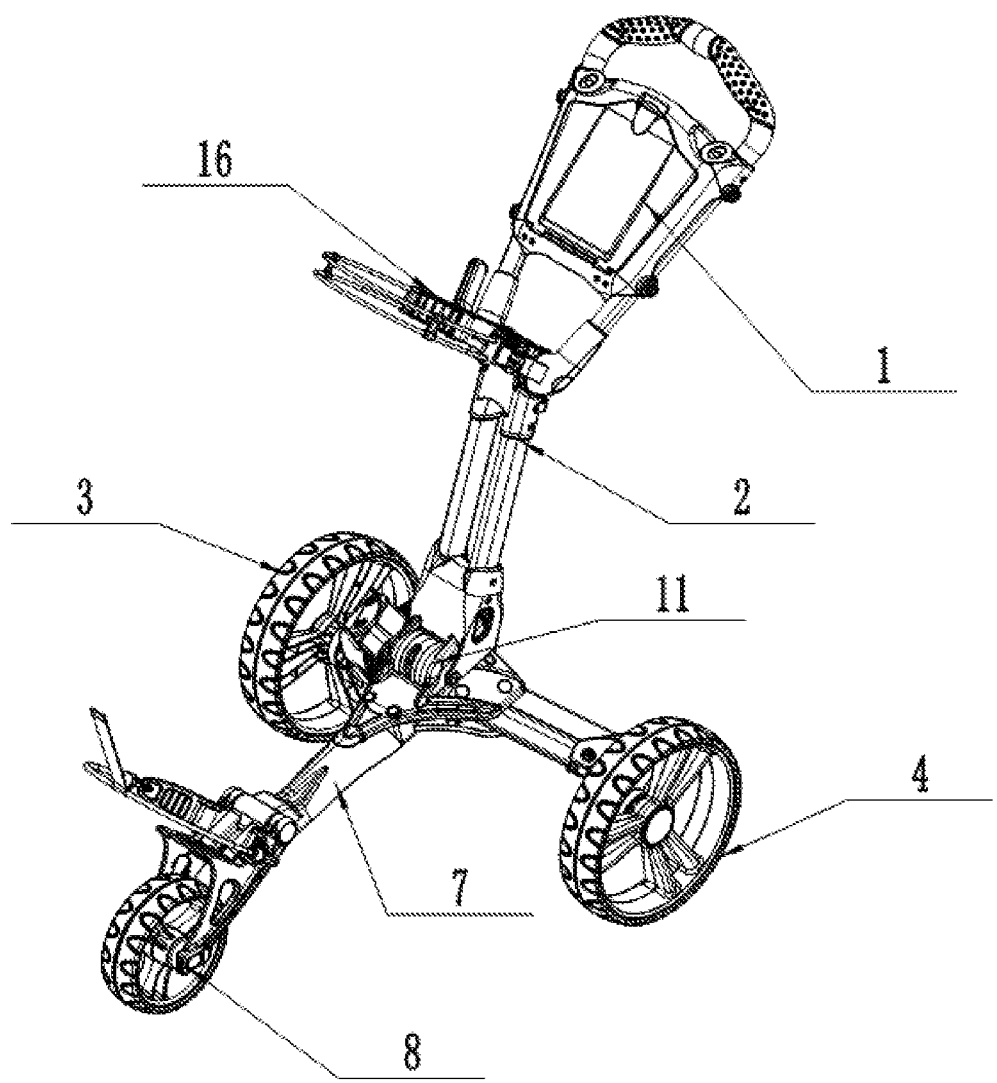
FIG. 1 is a schematic view of a preferred embodiment of a foldable golf trolley of the present application.
Figure 2:
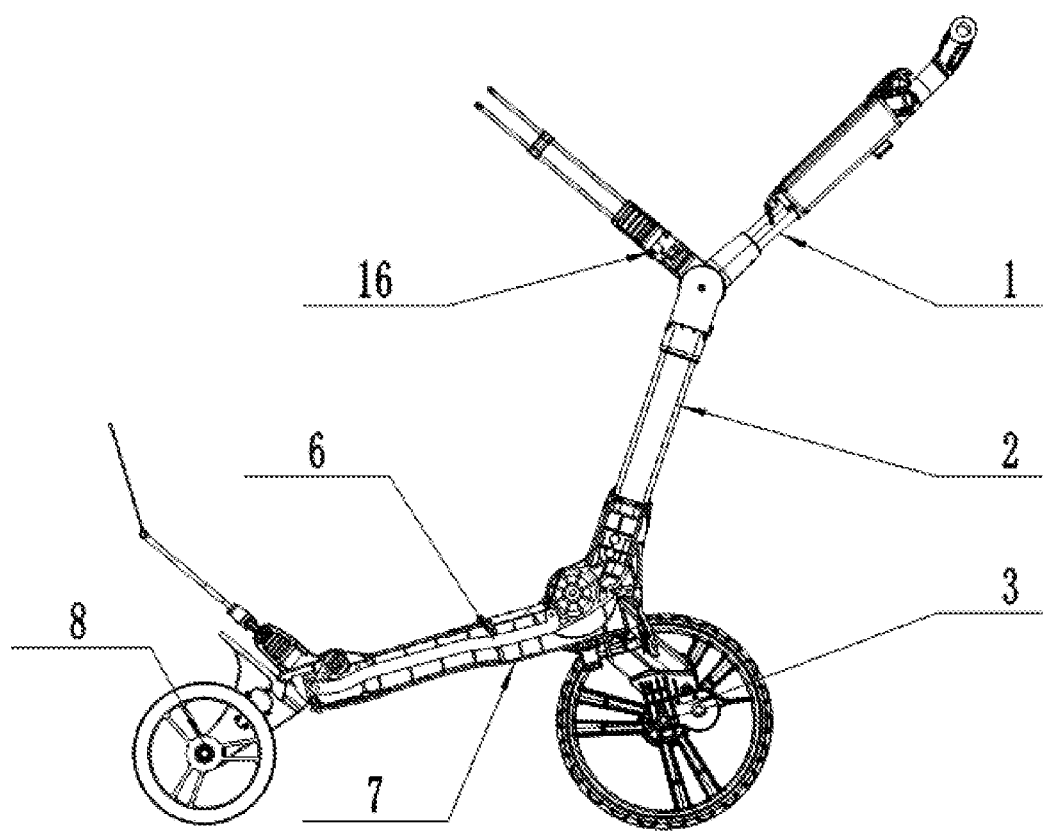
FIG. 2 is a cross sectional view of the foldable golf trolley in FIG. 1.
Figure 3:
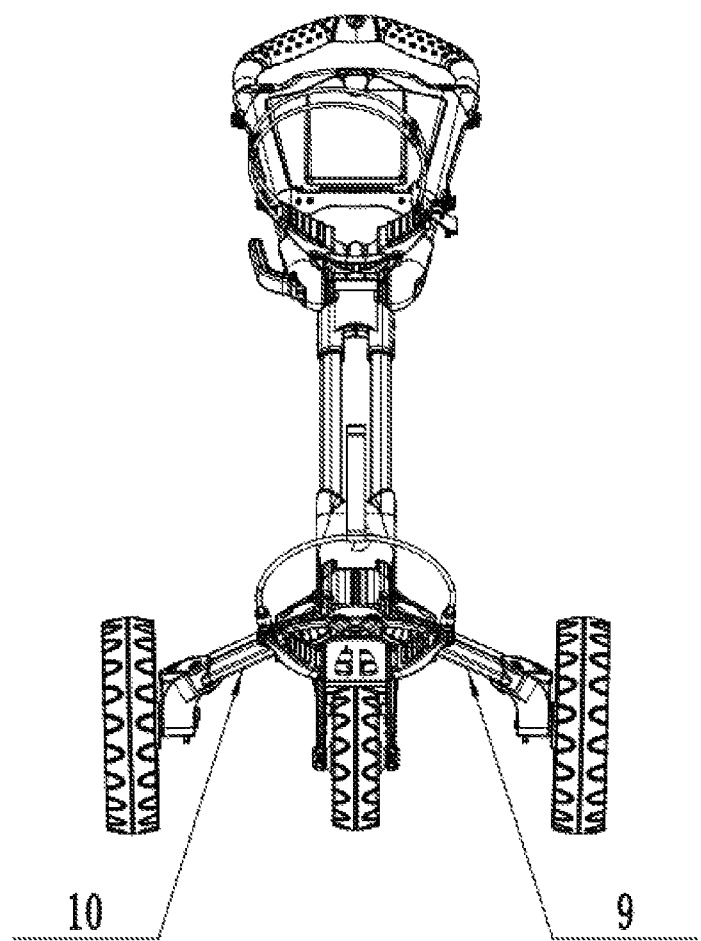
FIG. 3 is a front view of the foldable golf trolley in FIG. 1.
Figure 4:
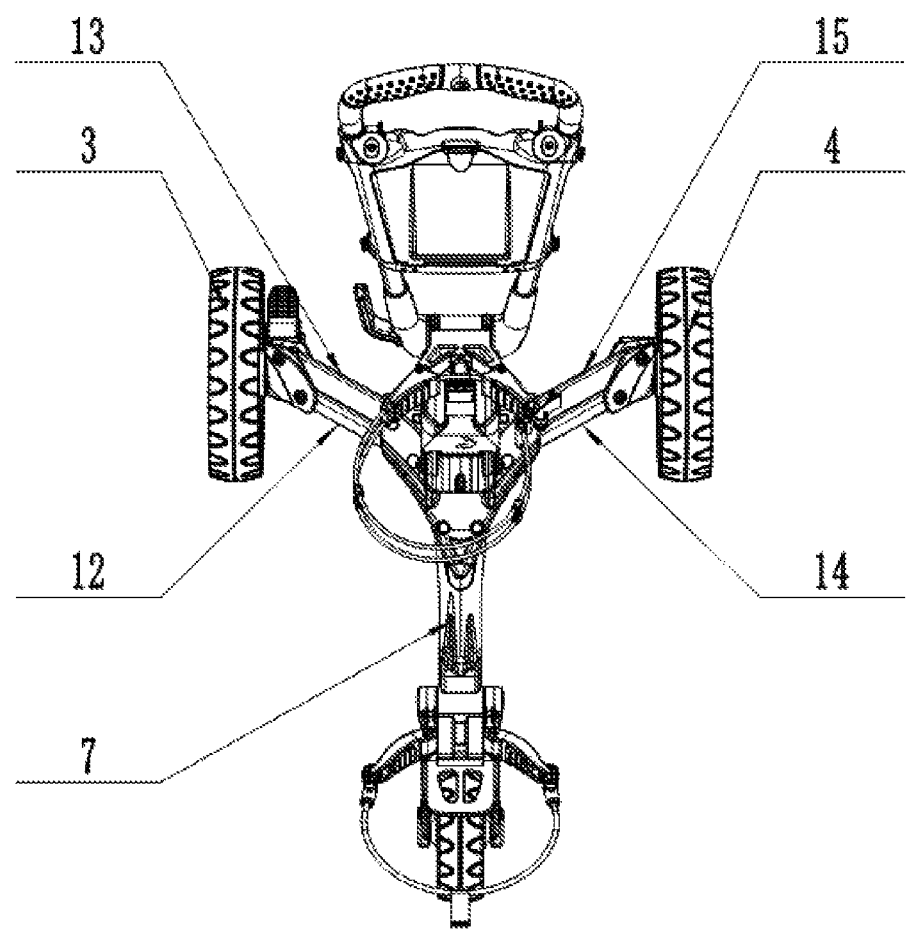
FIG. 4 is a top view of the foldable golf trolley in FIG. 1.

The reference numerals in the drawings and their designating parts are as follows: 1—handle assembly, 2—standing tube assembly, 3—right wheel assembly, 4—left wheel assembly, 6—front wheel connecting rod. 7—bottom tube assembly, 8—front wheel assembly, 9—left wheel connecting rod assembly, 10—right wheel connecting rod assembly, 11—bevel gear, 12—right wheel driving connecting rod, 13—right wheel driven connecting rod, 14—left wheel driving connecting rod, 15—left wheel driven connecting rod, 16—upper bag support assembly.

DETAILED DESCRIPTION

The technical solution provided by the embodiments of the foldable golf trolley of the present application will be described clearly and completely below. It is apparent that the described embodiments are only some embodiments of the foldable golf trolley, and not all of the embodiments. All other embodiments obtained by an ordinary technical person skilled in the art, without making any creative effort, are within the scope of protection of the foldable golf trolley of the present application.

Referring to FIGS. 1 to 6, an embodiment of the foldable golf trolley may include a standing tube assembly 2, a bottom tube assembly 7, a front wheel assembly 8, and a left and right wheel assembly 4, 3.

The standing tube assembly 2 may be movably coupled with the front wheel assembly 8 through a front wheel connecting rod 6. The bottom tube assembly 7 may be connected with the front wheel assembly 8 and the standing tube assembly 2. A front wheel four-rod linkage may be formed by the standing tube assembly 2, the front wheel connecting rod 6, the front wheel assembly 8 and the bottom tube assembly 7.

The standing tube assembly 2 may be connected with the left and right wheel assemblies 4, 3 through left and right wheel connecting rod assemblies 9, 10 respectively.

Figure 5:
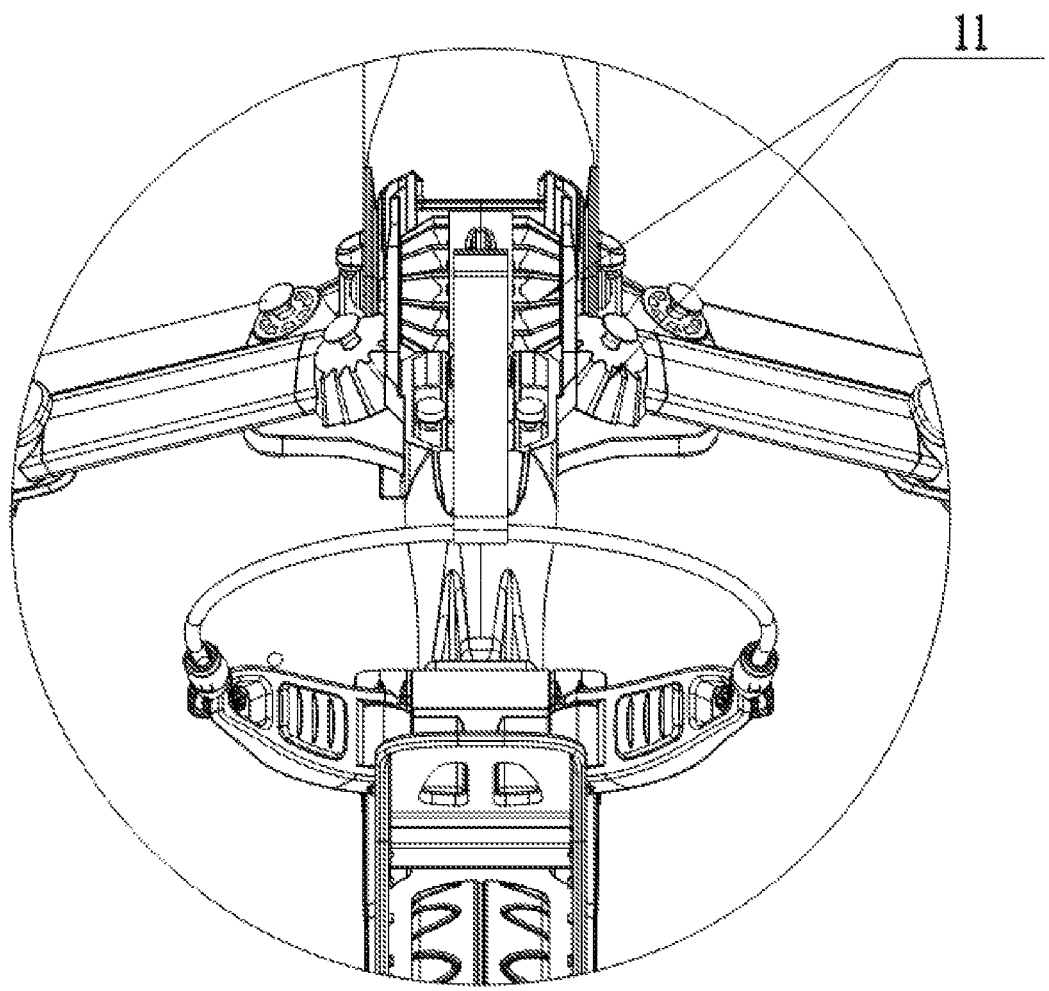
FIG. 5 is an enlarged view of a portion of the structure of the central hub of the foldable golf trolley in FIG. 2.
Figure 6:
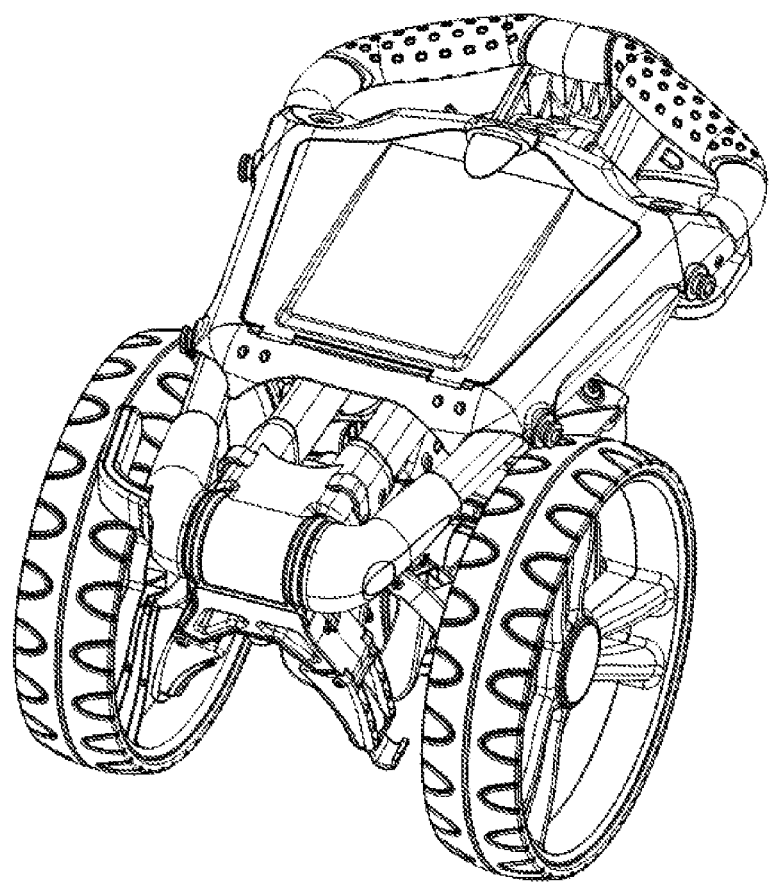
FIG. 6 is a schematic view of the folded golf trolley in FIG. 1.

The standing tube assembly 2, the left and right wheel connecting rod assemblies 9, 10 can achieve synchronized coupling movement through a central hub. The central hub may include a pair of symmetric left and right driving gears, and left and right driven gears engaging with the driving gears respectively, as shown in FIG. 5. The driving gears and the left and right driven gears can be bevel gears 11.

The left driven gear can provide driving power for a left wheel driving connecting rod 14. Left wheel connecting rod assembly 9 may include the left wheel driving connecting rod 14 and a left wheel driven connecting rod 15. A left wheel four-rod linkage may be formed by the left wheel driving connecting rod 14, the left wheel assembly 4, the left wheel driven connecting rod 15 and the bottom tube assembly 7.

The right driven gear can provide driving power for a right wheel driving connecting rod 12. Right wheel connecting rod assembly 10 may include the right wheel driving connecting rod 12 and a right wheel driven connecting rod 13. A right wheel four-rod linkage may be formed by the right wheel driving connecting rod 12, the right wheel assembly 3, the right wheel driven connecting rod 13 and the bottom tube assembly 7.

A handle assembly 16 may be connected with an upper end of the standing tube assembly 2.

When the golf trolley is being folded, the front wheel four-rod linkage, and the left and right wheel four-rod linkages can move in a direction towards the central of the golf trolley.

Firstly, the handle assembly 1 is pressed down. The handle assembly 1 and the standing tube assembly 2 are folded into "Z" shape towards the front of the golf trolley. In the meantime, when the standing tube assembly 2 moves forward, the central hub transmits driving power at the same time. The front wheel four-rod linkage, the left and right wheel four-rod linkages move towards the center of the trolley. The front wheel assembly 8 folds towards the bottom of the trolley. The left and right wheel assemblies fold into the two sides of the trolley. In this way, the whole trolley is folded. When the trolley is to be unfolded, it only requires a user to lift the handle assembly 1. The movably coupled connecting rod linkage assemblies unfold the whole trolley. It is quite simple and convenient for the operation.

The connecting region of the standing tube assembly 2 and the handle assembly 1 may be provided with an upper bag support assembly 16. The upper bag support assembly 16 can be rotated and folded.

In the foldable golf trolley of the present application, the whole trolley could be quickly folded into a compact structure. This can simplify the folding and unfolding operation of the golf trolley, making it more convenient to use the trolley and saving the user's time and energy.

The above-mentioned embodiments are merely some embodiments of the foldable golf trolley of the present application, and the scope of patent protection is not limited to these embodiments. Any equivalent structures or equivalent changes in process using the contents of the present patent specification, or any direct/indirect application in other related field of technology are within the scope of patent protection of the present application.

What is claimed is:

1. A foldable golf trolley comprising: a standing tube assembly; a bottom tube assembly; a front wheel assembly; and a left and right wheel assembly, wherein the standing tube assembly is movably coupled with the front wheel assembly through a front wheel connecting rod, the bottom tube assembly is connected with the front wheel assembly and the standing tube assembly, and a four-rod linkage is formed by the standing tube assembly, the front wheel connecting rod, the front wheel assembly and the bottom tube assembly;

wherein the standing tube assembly is connected with the left and right wheel assemblies through a left and right wheel connecting rod assembly respectively;

wherein the left wheel connecting rod assembly comprises a left wheel driving connecting rod and a left wheel driven connecting rod, and a left wheel four-rod linkage is formed by the left wheel driving connecting rod, the left wheel assembly, the left wheel driven connecting rod and the bottom tube assembly; and wherein the right wheel connecting rod assembly comprises a right wheel driving connecting rod and a right wheel driven connecting rod, and a right wheel four-rod linkage is formed by the right wheel driving connecting rod, the right wheel assembly, the right wheel driven connecting rod and the bottom tube assembly.

2. The foldable golf trolley according to claim 1, wherein the standing tube assembly, the left and right wheel connecting rod assemblies achieve synchronized coupling movement through a central hub, and the central hub comprises a pair of symmetric left and right driving gears, and left and right driven gears engaging with the left and right driving gears respectively.

3. The foldable golf trolley according to claim 2, wherein the left driven gear provides driving power for the left wheel driving connecting rod.

4. The foldable golf trolley according to claim 2, wherein the right driven gear provides driving power for the right wheel driving connecting rod.

5. The foldable golf trolley according to claim 1, wherein the front wheel four-rod linkage, the left and right wheel four-rod linkages move in a direction towards a center of the trolley when the trolley is being folded.

6. The foldable golf trolley according to claim 2, wherein the driving gears, the left and right driven gears are bevel gears.

7. The foldable golf trolley according to claim 1, wherein a handle assembly is connected with an upper end of the standing tube assembly.

8. The foldable golf trolley according to claim 7, wherein a connecting region of the standing tube assembly and the handle assembly is provided with an upper bag support assembly.

* * * * *